April 25, 1939. H. G. FISCHER 2,155,786
HIGH FREQUENCY APPARATUS
Filed July 9, 1936 6 Sheets-Sheet 1
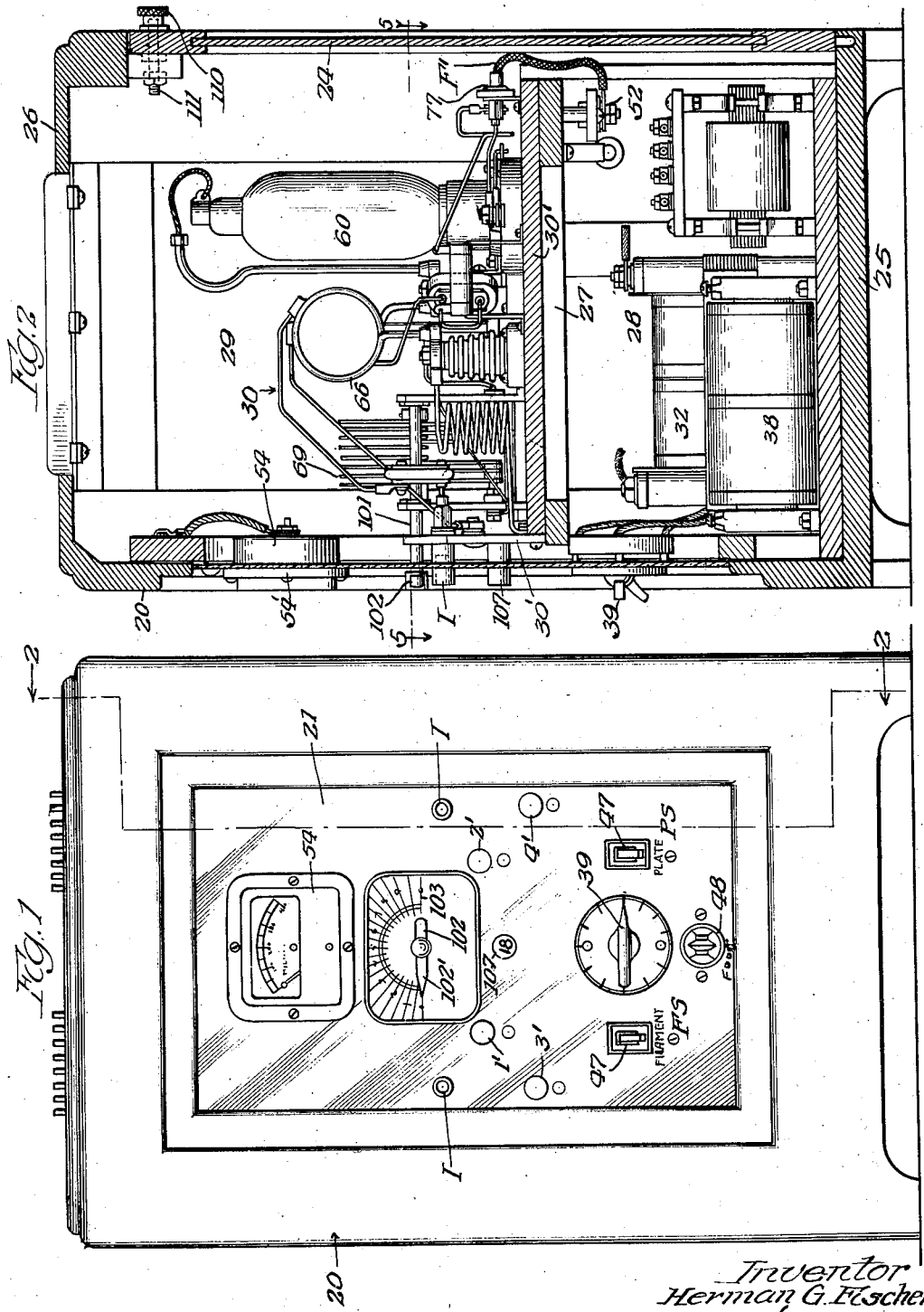
Inventor
Herman G. Fischer

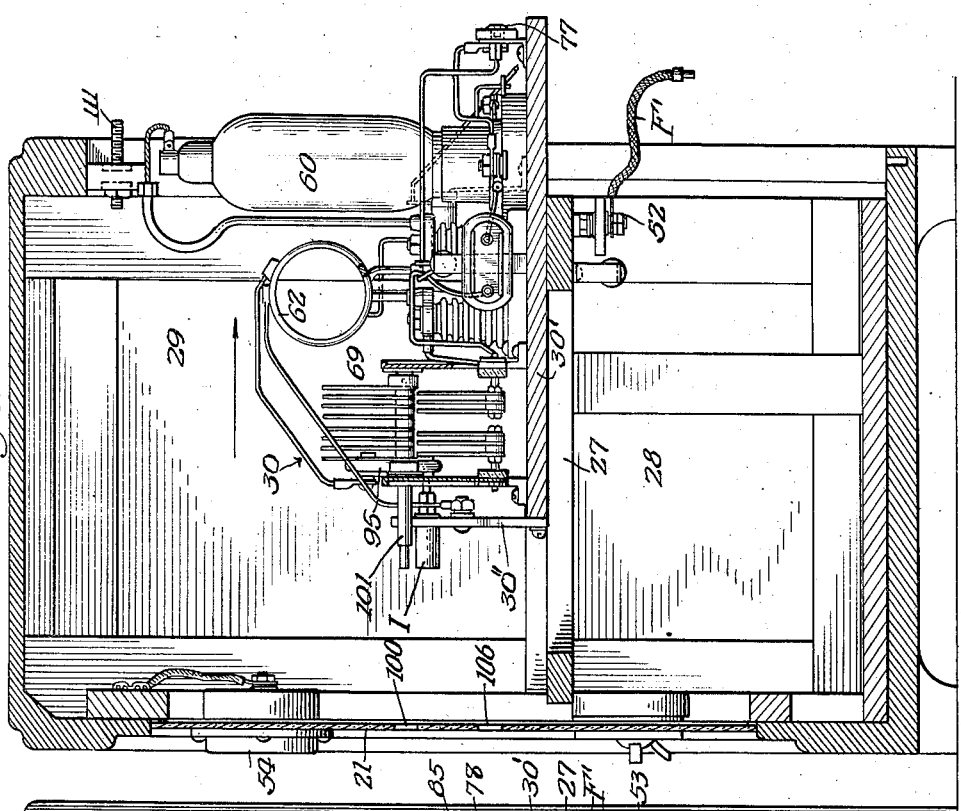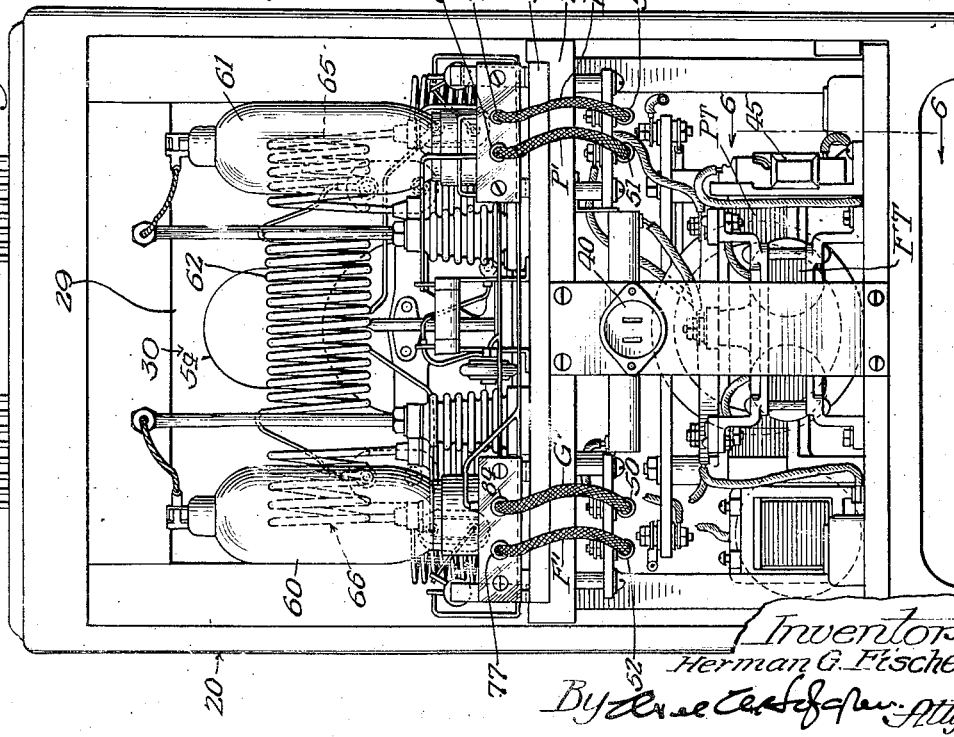

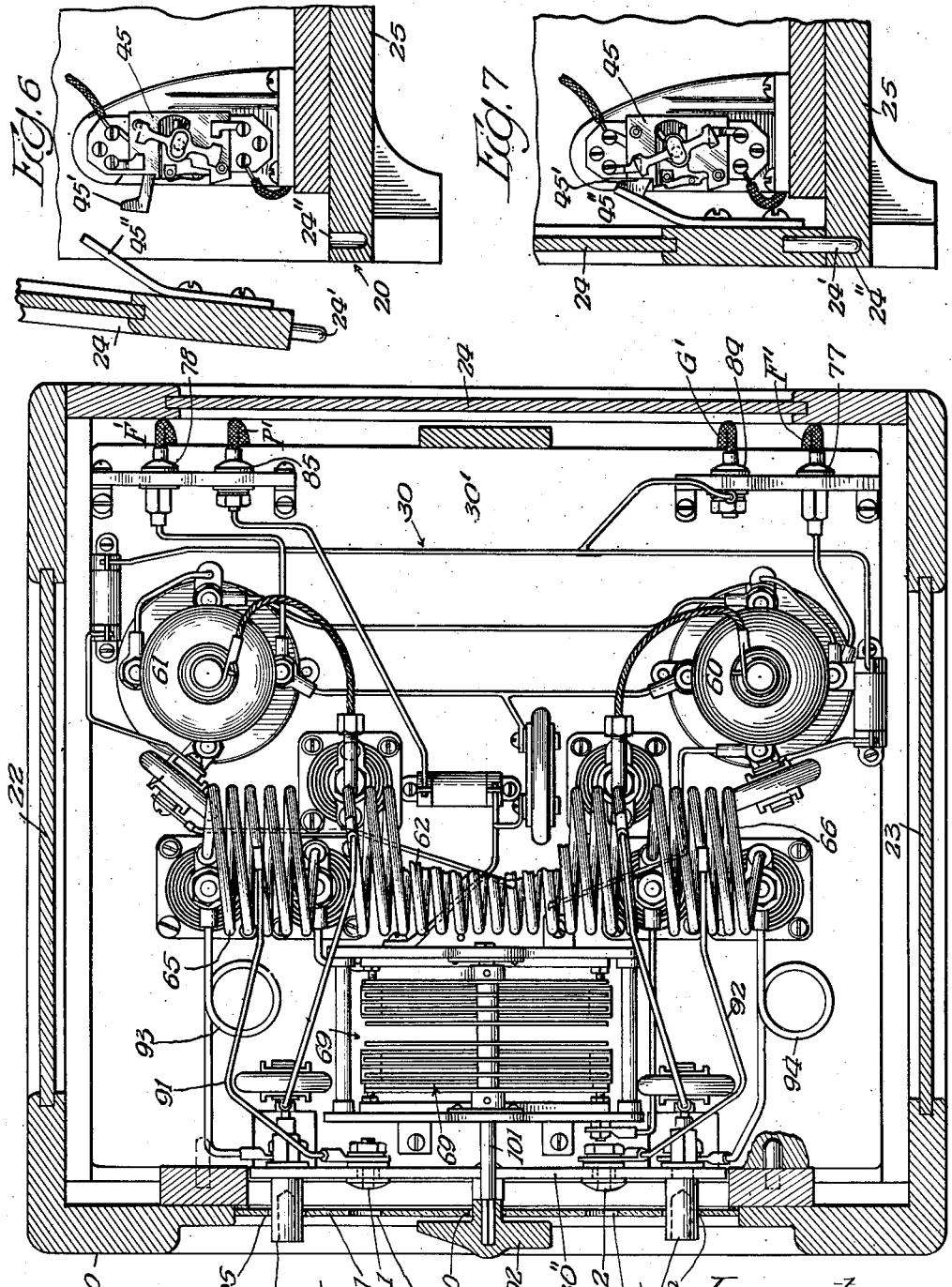

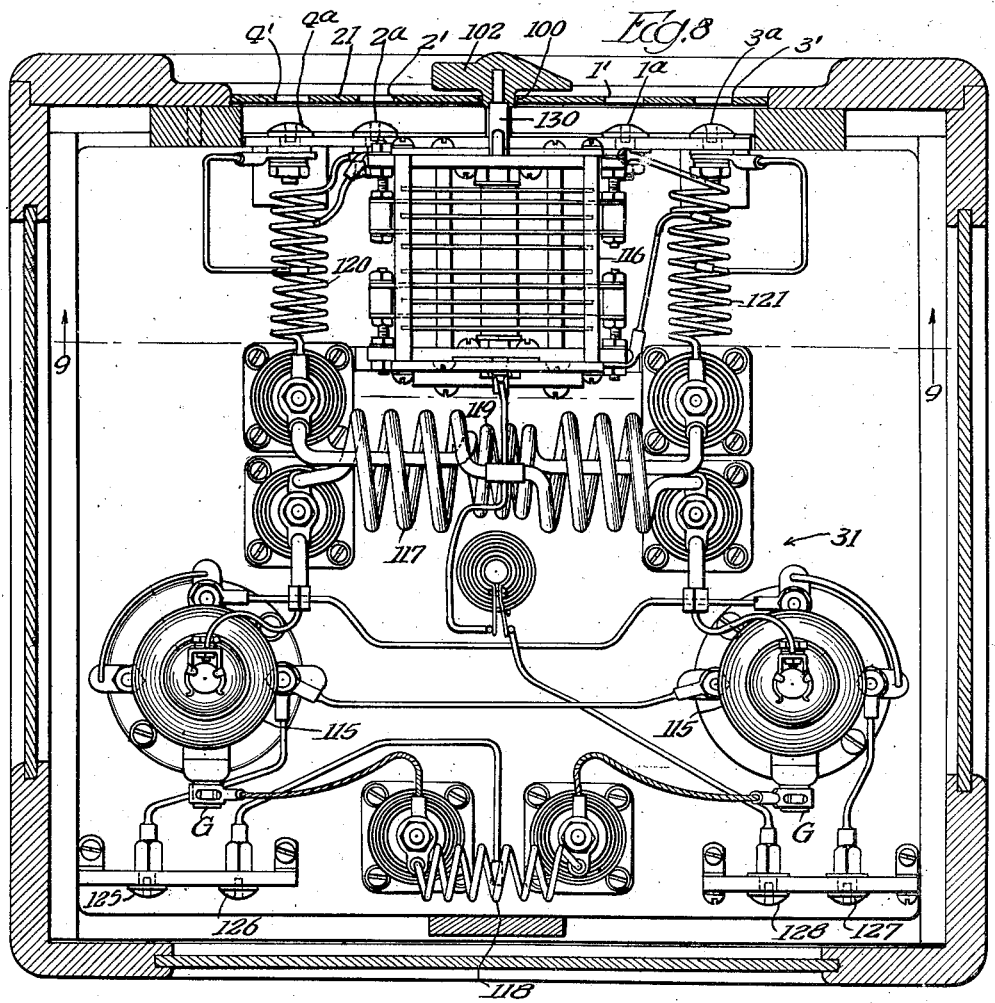

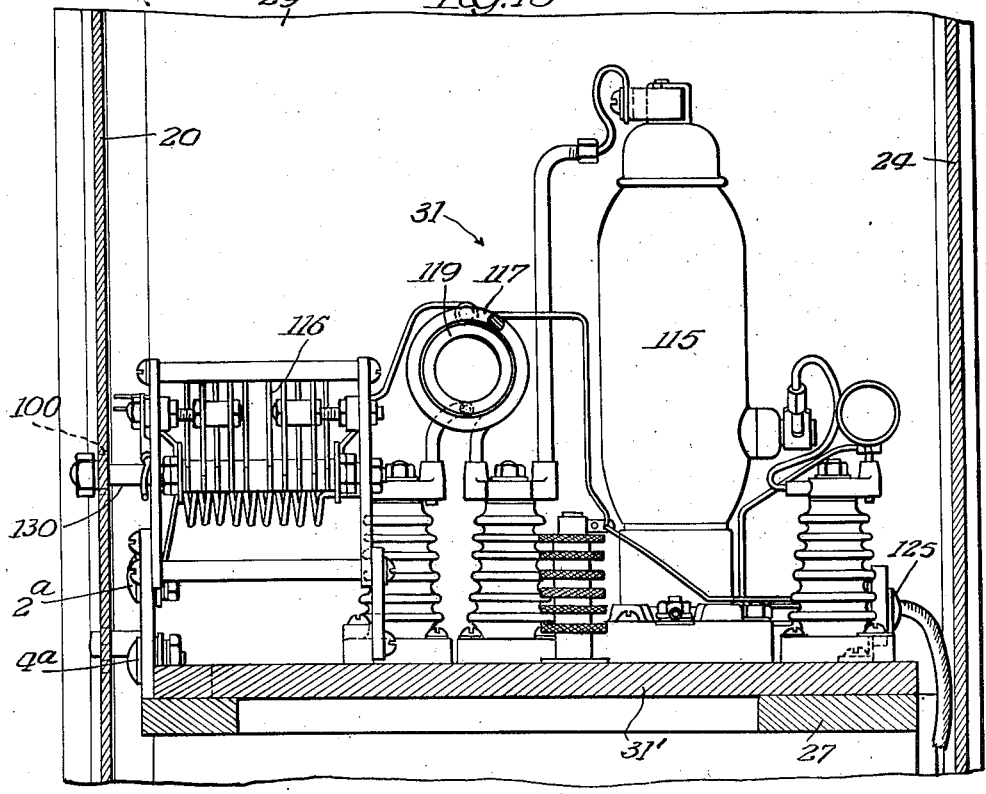
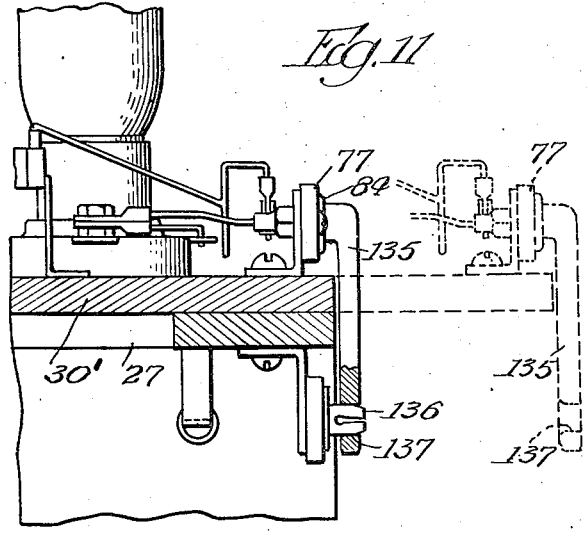
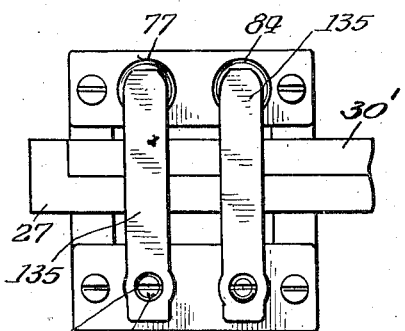

April 25, 1939.　　　H. G. FISCHER　　　2,155,786
HIGH FREQUENCY APPARATUS
Filed July 9, 1936　　　6 Sheets-Sheet 6
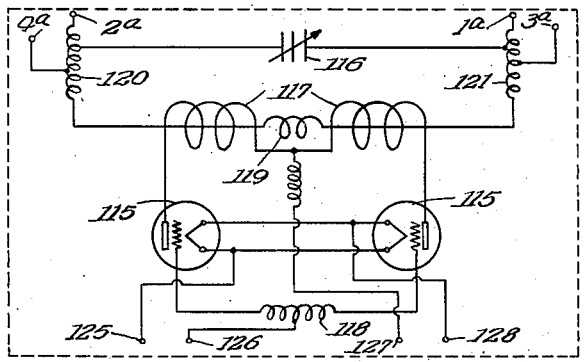
Fig.15
6-METER OSCILLATOR
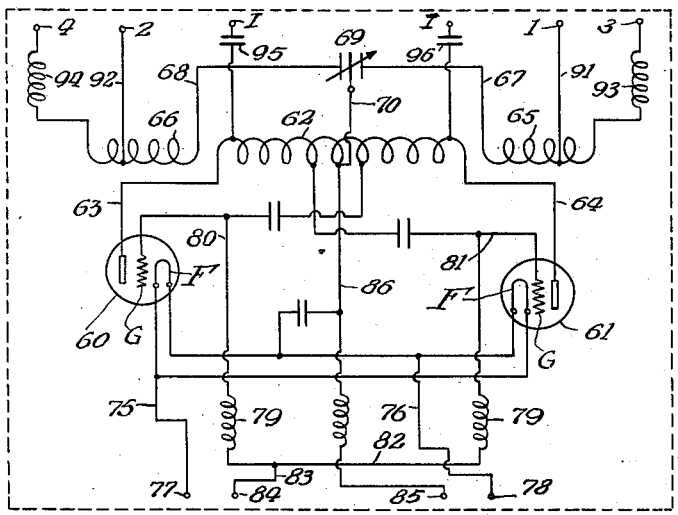
Fig.14
18-METER OSCILLATOR
Fig.13
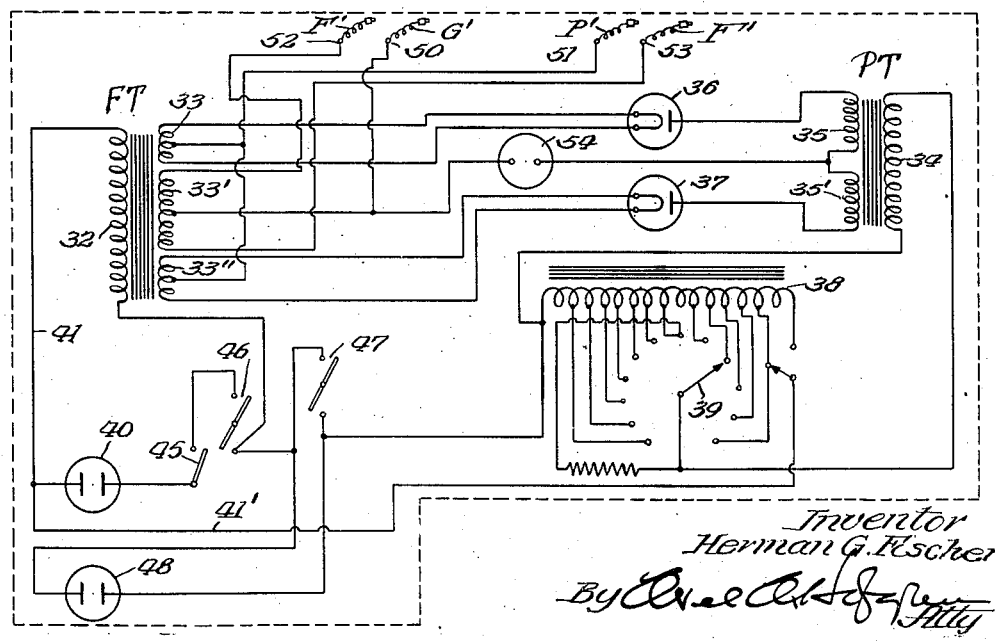
Inventor
Herman G. Fischer
By [signature] Atty Patented Apr. 25, 1939

2,155,786

UNITED STATES PATENT OFFICE 2,155,786

HIGH FREQUENCY APPARATUS

Herman G. Fischer, River Forest, Ill., assignor to H. G. Fischer & Co. Inc., Chicago, Ill., a corporation of Illinois Application July 9, 1936, Serial No. 89,854

10 Claims. (Cl. 128—422)

The invention relates generally to high frequency apparatus and more particularly to such apparatus adapted to be used by physicians for therapeutic and other similar purposes.

For therapeutic, surgical or similar purposes several different frequencies or wave lengths may be employed and the various elements of the apparatus for producing any particular wave length must be properly and accurately interrelated as to design and assembly. The apparatus generally comprises transforming and rectifying means arranged to supply current to an oscillator which, by its design, determines the wave length of the output current to the patient's circuit. In connection with each oscillator there is generally provided a capacity current control designed particularly for the oscillator with which it is used.

At the present time wave lengths of 6, 12, 18 or 24 meters, as well as others, are commonly employed. While any one of these wave lengths may be employed with satisfactory results for substantially all therapeutic or surgical purposes, there is an occasional swing of opinion favoring a particular wave length. At least there is a growing belief that certain wave lengths are more beneficial than others for certain treatments, or for the treatment of different portions of the body. To follow these trends in thought, a physician, at present, must have several complete machines and thus must have such a large investment in high frequency apparatus that it becomes a substantial burden which many physicians are loath to assume.

An important object of the present invention, therefore, is to obviate this necessity for such a burdensome investment by providing a new and improved high frequency apparatus wherein the various operative elements are interrelated to each other in such a manner as to permit ready disconnection and removal of the oscillator portion thereof and replacement by another oscillator arranged to supply current of a different wave length.

Another object is to provide such apparatus housed and arranged in a cabinet in such a manner as to permit withdrawal of the oscillator from the cabinet as a unit for replacement by an oscillator having different output characteristics.

Another object is to provide high frequency apparatus of this character wherein the operative elements of the device are automatically disabled as an incident to the opening of the cabinet.

Another object is to provide high frequency apparatus wherein the removable oscillator unit is automatically connected in proper relation to the power unit as an incident to the placing of the oscillator in the cabinet.

Further objects and advantages will become readily apparent from the following detailed description taken in connection with the accompanying drawings, in which:

Fig. 1 is a front elevation of a preferred form of the invention.

Fig. 2 is a section approximately along the line 2—2 of Fig. 1.

Fig. 3 is a rear view of the preferred form of apparatus with the rear cover removed.

Fig. 4 is a view similar to Fig. 2 (with the rear wall of the cabinet removed and the oscillator partly withdrawn).

Fig. 5 is an enlarged plan section approximately on the line 5—5 of Fig. 2.

Fig. 6 is an enlarged fragmentary section approximately along the line 6—6 of Fig. 3 with the rear wall removed.

Fig. 7 is a similar view with the rear wall in position.

Fig. 8 is a view similar to Fig. 5 with a different form of oscillator unit installed.

Fig. 9 is a section along the line 9—9 of Fig. 8.

Fig. 10 is a fragmentary side elevation of the oscillator unit illustrated in Fig. 8.

Fig. 11 is a fragmentary view similar to Fig. 2 and showing a modified form of connecting means.

Fig. 12 is a fragmental view of the connecting means of Fig. 11 as viewed from the right in Fig. 11.

Fig. 13 is a diagram of the power transformer, control and rectifying mechanism positioned in the lower compartment of the apparatus.

Fig. 14 is a wiring diagram of the oscillator unit illustrated in Figs. 1 to 5.

Fig. 15 is a wiring diagram of the oscillator unit illustrated in Figs. 8 to 10.

While there is illustrated in the drawings and shall hereafter be described in detail a preferred form of the invention, it is to be understood that the invention is not limited to the particular construction and arrangement shown, it being contemplated that various changes may be made by those skilled in the art without departing from the spirit and scope of the invention as expressed in the appended claims.

In the exemplary form illustrated in the drawings, the invention is herein embodied in a high frequency apparatus of the type used for therapeutic and other similar purposes. This apparatus (see Figs. 1 to 5) is contained in a cabinet 20 having a front instrument mounting panel 21, side walls 22 and 23, a rear removable wall or panel 24, a bottom board 25, a top 26 and an intermediate shelf or oscillator unit supporting frame 27. The lower compartment 28 formed intermediate the bottom 25 and the shelf 27 is herein utilized for the power transformer, control and rectifying devices illustrated diagrammatically in Fig. 13. A compartment 29 formed intermediate the shelf 27 and the top 26 of the cabinet is utilized to house one of a plurality of removable and interchangeable oscillator units of the apparatus. One form of such a unit, adapted to generate high frequency current of a wave length of approximately 18 meters is indicated at 30 in Figs. 2 to 5, while a similar unit for generating current with a wave length of approximately 6 meters is indicated at 31 in Figs. 8 to 10.

In the present form of the invention, the power transformer, control and rectifier devices are permanently mounted in the cabinet and on the control panel and consist generally (Figs. 2, 3 and 13) of a filament transformer FT having a primary 32 and secondaries 33, 33' and 33", a plate transformer PT having a primary 34 and secondaries 35 and 35', a pair of rectifier tubes 36 and 37 suitably connected to said transformer secondaries, a 12-point auto transformer control having a winding 38 and a control switch having a handle 39. A suitable power supply, such as 60 cycle alternating current, may be connected to the apparatus by means of a plug receptacle 40 accessible through a suitable aperture in the back panel 24. One terminal of this receptacle is connected directly to one terminal of the filament transformer primary 32 by a wire 41 and to one end of the auto transformer winding 38 by means of a wire 41', whereas the other terminal of the receptacle 40 is connected to the other terminal of the primary 32 through a safety switch 45 (Figs. 3, 6, 7 and 13) and a filament switch 46 (Figs. 1 and 13). A plate circuit switch 47 is suitably connected in series with switch 46 in the lead to the other terminal of the winding 38, and preferably an outlet connection receptacle 48 is connected in parallel with the late switch 47 for receiving foot switch leads. The filament switch 46 and plate switch 47 are preferably of the tumbler type illustrated, and the safety switch 45 may also be of the tumbler type and arranged to be closed by the rear panel 24 when said panel is properly installed to close the back opening in the cabinet, as hereinafter more fully described.

Power output leads from the rectifier device connect to a pair of filament terminals 50 and 51 (Figs. 2, 3 and 13), a plate terminal 52 and a grid terminal 53. Included in the connection from the midpoint of the plate transformer secondaries 35, 35' is a milliammeter 54 (Figs. 1 to 4 and 13) which meter is preferably mounted in a fixed position on the front panel 21 to indicate the power output of the apparatus when in operation.

The oscillator unit illustrated in Figs. 1 to 5 and 14 comprises generally a pair of tubes 60 and 61, the plates of which are connected to the opposite ends of an inductance coil 62 by wires 63 and 64. A pair of laterally spaced inductance coils 65 and 66 are positioned in alinement with and at opposite ends of the coil 62. The adjacent ends of these coils are connected by wires 67 and 68 to stationary plate sections of a tuning condenser 69. The rotary plates of this condenser are connected by a wire 70 to the midpoint of the coil 62.

The filaments F of the tubes are suitably connected by wires 75 and 76 to a pair of filament terminals 77 and 78 carried on the rear portion of the base 30' of the oscillator unit. The grids G of the tubes are connected through suitable radio frequency chokes 79 and wires 80, 81, 82 and 83 to a grid terminal 84 carried on the rear portion of the base 30'. A plate terminal 85 on the base 30' adjacent the other filament terminal 78 is connected through a radio frequency choke and by a wire 86 to the midpoint of the coil 62.

In the present form of the invention, a plurality of output terminals are provided for the oscillator unit to facilitate attaching the electrode or patient's circuit leads. Thus, as illustrated in Figs. 5 and 14, terminals 1, 2, 3 and 4 are provided, terminals 1 and 2 being connected through suitable wires 91 and 92 to intermediate points on the coils 65 and 66, whereas terminals 3 and 4 are connected through suitable tuning coils 93 and 94 to the ends of coils 65 and 66. The form of oscillator unit illustrated in Figs. 1 to 5 and 14 also has a pair of terminals I connected through suitable protective condensers 95 and 96 to points on the coil 62 approximately one-half turn from the ends thereof. These outlet terminals I are adapted for use with a coil type of electrode for induction therapy.

As mentioned hereinbefore, the invention makes provision for the ready removal of one oscillator unit and the insertion of another into the cabinet 20 for the purpose of changing the wave length of the high frequency current. This is accomplished by arranging the front panel 21 for the reception of the control member of the tuning device of the different oscillator units as well as for the reception of the output terminals of the different units and furthermore by providing suitable and convenient means for connecting the output terminals of the rectifier unit to the input terminals of the oscillator unit. As illustrated herein, the panel 21 is provided with a suitable opening 100 (Figs. 4 and 5) through which the control member or shaft 101 of the tuning condenser projects when the oscillator unit is properly installed, the end of the shaft 101 being of irregular section so as to require the application of a manual control handle 102 in a predetermined angular position with respect to the shaft. In this way a pointer portion 102' of the member 102 (Fig. 1) indicates on a scale 103 the angular position of the rotor of the condenser. The induction therapy terminals I project from the front panel 30" of the unit as illustrated most clearly in Figs. 2, 4 and 5 and extend through suitable openings 104 and 105 in the panel 21 to facilitate insertion of a pair of electrode leads. The panel 21 is also provided with openings 1', 2', 3' and 4' suitably positioned so that when the oscillator unit is installed these openings are alined with the output terminals 1, 2, 3 and 4 respectively so that the connectors on the ends of the electrode leads may be inserted through the openings, 1', 2', etc. and into engagement with the output terminals 1, 2, etc. Preferably, an additional opening 106 is provided somewhat centrally of the panel 21 to receive a plug 107 mounted on the front panel 30" of the oscillator unit, which plug may conveniently bear a numeral indicating the wave length of the oscillator, the wave length in Fig. 1 being indicated as 18.

To connect the output terminals of the rectifier device with the input terminals of the oscillator unit, a plurality of relatively short, flexible leads F', G' and P' are provided. The lower ends of these leads are suitably anchored to the corresponding output terminals of the rectifier device, the upper ends of these leads being provided with plug type terminals for insertion into input terminals 77, 78, 84 and 85 of the oscillator, said input terminals being preferably of a socket type. These leads are preferably short, not only to facilitate their insertion in the socket terminals, but also to require the oscillator unit to be inserted completely into the cabinet before it is possible to connect the upper ends of the leads to the socket terminals of the oscillator.

As an additional means to insure complete insertion of the oscillator unit before the unit can be operated, the safety switch 45 is so mounted in the lower portion of the cabinet 20 that the operating element 45' of the switch is engaged by an arm or bracket 45" carried on the lower portion of the rear panel 24. Since this panel is installed by inserting dowel pins 24' (Fig. 6) in sockets 24" in the base 25 and by attaching nut devices 110 (Fig. 2) to screw devices 111 which project from the upper portion of the cabinet and through suitable apertures in the panel 24, it will be evident that the switch 45 is not closed until the rear panel is installed. Furthermore, in order to install the rear panel, the oscillator unit must be completely inserted so that the base 30' thereof does not project rearwardly beyond the inner surface of the rear panel 24. The switch 45 is of the spring return or normally open type so that upon removal of the rear panel the switch will open automatically.

Although it is contemplated that oscillator units of any desired output frequency may be substituted in the apparatus, there is illustrated herein a single alternative oscillator unit designed to generate high frequency current of approximately 6 meter wave length. This unit, as illustrated in Figs. 8 to 10, is mounted on a removable base 31' and comprises (Figs. 8 to 10 and 15) a pair of tubes 115, a tuning condenser 116, an inductance coil 117 connected between the plates of the tubes, an inductance coil 118 connected between the grids of the tubes and an inductance coil 119, positioned within the coil 117, and also coils 120 and 121 connected to the opposite ends of the coil 119 and to output terminals 1ª, 2ª, 3ª and 4ª. The output terminals 1ª and 2ª are connected to the free ends of the coils 120 and 121; the output terminals 3ª and 4ª are connected to intermediate portions of the coils 120 and 121, and the two stationary sections of the tuning condenser 116 are connected to the coils 120 and 121 intermediate the points of connection of the output terminals. This form of oscillator unit is also provided with input terminals of the socket type mounted in pairs on the rear portion of the base 31' as shown most clearly in Figs. 8 and 9. Thus one filament input terminal 125 and a grid terminal 126 are mounted at one side of the base 31' and another filament terminal 127 and a plate terminal 128 are mounted at the other side of the base. The input terminals on this oscillator unit are preferably located in positions corresponding exactly with the positions of corresponding input terminals on the 18 meter unit.

Furthermore, the control member or shaft 130 of the tuning condenser 116 is located so as to protect through the opening 100 in the front panel 21, and the output terminals 1ª, 2ª, 3ª and 4ª of the oscillator unit are located so as to aline perfectly with the openings 1', 2', 3' and 4' respectively in the front panel 21.

In order to remove one oscillator unit from the cabinet, it is merely necessary to remove the handle 102 of the tuning condenser from the condenser shaft and then, after removing the rear panel 24, disconnect the leads F', G', P' and F' from the oscillator input terminals. The oscillator unit may then be withdrawn rearwardly on its base 30' as illustrated in Fig. 4, and removed from the cabinet. Thereafter, another oscillator unit such, for example, as the one illustrated in Figs. 8 to 10 may be moved into the upper compartment of the cabinet from the rear by sliding the base 31' thereof onto the shelf 27 so that the tuning condenser shaft 130 projects through the panel 21. Since the ends of the shafts of the tuning condenser on the various oscillator units are also formed with the same irregularity, the application of the control handle 102 to the front of a condenser shaft will cause the pointer portion 102' to indicate the location of the rotor section of the condenser for each unit. Thereafter, by connecting the leads F', G' etc. to the input terminals of the oscillator unit, the rear panel 24 may be properly installed to close the back of the cabinet and close the safety switch 45, thus placing the apparatus in condition for operation.

In Figs. 11 and 12 of the drawings there is illustrated a high frequency apparatus having an alternative form of connecting means for establishing the electrical connection between the output terminals of the power unit and the input terminals of the oscillator. By this form of connecting means the desired electrical circuits are established automatically as the oscillator is moved forward on the shelf 27 to its operative position in the cabinet. Thus, as shown in Figs. 11 and 12, a relatively rigid switch member 135 is secured to each of the input terminals 77, 78, 84 and 85 of the oscillator, so as to depend from the rear edge of the oscillator base and past the supporting shelf 27. In corresponding positions on the lower rear edge of the shelf 27, a plurality of complemental spring clips or contacts 136 are mounted so that as the oscillator is moved forwardly into its operative position in the cabinet, suitable openings 137 in the several switch members 135 will be engaged with the corresponding contacts 136. The contacts 136 are connected to the terminals 50, 51, 52 and 53 so that when the switch members 135 and 136 are thus connected, the oscillator is conditioned for operation.

By reason of the provision of apparatus constructed to permit ready removal and replacement of the oscillating unit, the present device may be purchased by users with the assurance that any change in operative technique may be followed at a nominal cost. Moreover, the maker is able, with the present device, to fill orders promptly without necessity for carrying a large inventory.

In the substitution of various oscillator units, the connections to be effected are of a simple character so that they may be made by relatively unskilled help, and the safety switch means acts invariably to protect the person making such changes. Since the connections between the input and output terminals can be made only after the oscillator is in its proper position in the cabinet, proper performance of the device is assured.

I claim as my invention:

1. High frequency apparatus comprising, in combination, a cabinet having a front wall with a control panel therein and a removable back wall, said control panel having a plurality of openings therein, an oscillator unit having patient's terminals and a tuning means with a manual control element therefor, said terminals and said control element being located on one side of said unit, means for supporting and guiding said unit for movement through the back of said cabinet forwardly toward said panel to register said terminals and said control element each with one of said openings, transforming and rectifying means mounted within said cabinet, and means located within and adjacent the back of said cabinet for establishing operative connection between said transforming and rectifying means and said unit.

2. High frequency apparatus comprising, in combination, a cabinet having a front control panel, an open back, a panel for closing said open back, and means for supporting a power unit and an oscillator unit in predetermined adjacent positions in said cabinet, a power unit permanently mounted in said cabinet and having power output terminals disposed in spaced relation along and adjacent to the line of division between the oscillator unit and said power unit, an oscillator unit removably mounted in said cabinet and having correspondingly arranged input terminals, said input and output terminals being located adjacent to said open back of the cabinet and adjacent to each other, and means for connecting said input and output terminals.

3. High frequency apparatus comprising, in combination, a cabinet having a control panel in one side thereof and a removable side wall, said panel having a plurality of openings formed therein, a current indicating device permanently mounted on said panel, transforming and rectifying means permanently mounted in said cabinet, an oscillator unit having patient's terminals on one side of said unit and a tuning means for said unit, an operating element for said tuning means positioned on the same side of the unit as said terminals, said unit being adapted to be positioned with the terminal side facing the inside surface of said panel and being movable in this position into the cabinet when said side wall is removed, means for supporting and guiding said unit in such movement to register said element and said terminals with said openings upon completion of such movement, detachable means for connecting said transforming and rectifying means with said unit to supply power thereto, and means permanently connecting said transforming and rectifying means with said indicating device to operate said device in accordance with the current flowing through said patient's terminals.

4. High frequency apparatus comprising, in combination, a cabinet having a front control panel, a removable back wall and an intermediate shelf dividing said cabinet into upper and lower compartments, a power unit mounted in said lower compartment with a control element and an indicator element permanently associated therewith and mounted on said front panel, said panel having a plurality of openings therein, an oscillator unit adapted to be inserted forwardly through the open back of said cabinet and having a control element and a plurality of terminals disposed for registry with said panel openings, a plurality of power output terminals for said power unit disposed along the lower rear edge of said shelf, and said oscillator unit having a plurality of input terminals correspondingly arranged to be positioned along the upper rear edge of said shelf, and means for detachably connecting said output and input terminals.

5. High frequency apparatus comprising, in combination, a cabinet having a front control panel and an open back, a removable closure for said back, a power unit mounted in said cabinet adjacent to one portion of said front panel and having a control element mounted on said portion of the panel, an oscillator unit positioned in said cabinet adjacent to a second portion of said panel, said oscillator unit being withdrawable from said cabinet by movement rearwardly away from said panel and through said open back, said units having similarly positioned terminals disposed at spaced points along their adjacent rear edges, means for detachably connecting the corresponding terminals of said units, said second portion of said panel having a plurality of openings formed therein, and said oscillator having a tuning element alined with one of said openings and a plurality of patient's terminals, each alined with one of the other openings.

6. High frequency apparatus comprising, in combination, an upright cabinet having a front control panel, a rear wall having an opening therein and a partition dividing the cabinet into a lower and an upper compartment, transforming and rectifying means disposed in said lower compartment and having power output terminals, an interchangeable oscillator unit removably inserted as a unit through the opening in the rear wall and supported on and guided by said partition, said oscillator unit having power input terminals disposed at the rear of the unit to be accessible through the opening in the rear wall, and short flexible leads each connected at one end to one of the output terminals and long enough to be connected with one of the input terminals only when said oscillator unit is properly inserted.

7. High frequency apparatus comprising, in combination, a cabinet having a fixed front panel and a rear wall movable to open the rear side of the cabinet, transforming and rectifying means mounted in said cabinet, a power supply circuit including a switch biased to open position connected to said means, power output terminals leading from said means, an oscillator unit adapted to be removably positioned in an operating position within said cabinet and having input terminals, means carried by said oscillator unit adapted automatically to connect said input and said output terminals as an incident to positioning of said oscillator unit within said cabinet, and means on said rear wall cooperating with said switch and adapted to close the same to render the apparatus operative upon moving the wall to closed position.

8. In a high frequency apparatus for therapeutic and surgical use, a cabinet having a control panel on one side and an opening in another side, said panel having apertures therein, an oscillator unit including a tuning means removably mounted in said cabinet for withdrawal and replacement as a unit through the opening, a control member for said tuning means and patient's terminals on said unit adapted to project through the apertures in said control panel when said unit is positioned within the cabinet, and an actuating member removably attachable to the projecting end of said control member.

9. High frequency apparatus comprising, in combination, a cabinet having a front wall with a control panel therein and a removable back wall, said control panel having a plurality of openings therein, an oscillator unit having patient's terminals projecting forwardly therefrom, means for supporting and guiding said unit for movement through the back of said cabinet forwardly toward said panel to register said terminals each with one of said openings, transforming and rectifying means mounted within said cabinet, and means for establishing operative connection between said transforming and rectifying means and said unit.

10. High frequency apparatus comprising, in combination, a cabinet having a fixed front panel and a rear wall movable to open the rear side of the cabinet, transforming and rectifying means mounted in said cabinet, a power supply circuit including a switch biased to open position connected to said means, power output terminals leading from said means, an oscillator unit adapted to be removably positioned in an operating position within said cabinet and having input terminals, means carried by said oscillator unit adapted to connect said input and said output terminals when said oscillator unit is positioned within said cabinet, and means on said rear wall cooperating with said switch and adapted to close the same to render the apparatus operative upon moving the wall to closed position.

HERMAN C. FISCHER.